No. 793,543. PATENTED JUNE 27, 1905.
M. SCHROEDER.
CATALYTIC APPARATUS FOR MAKING SULFURIC ANHYDRID.
APPLICATION FILED AUG. 11, 1900.
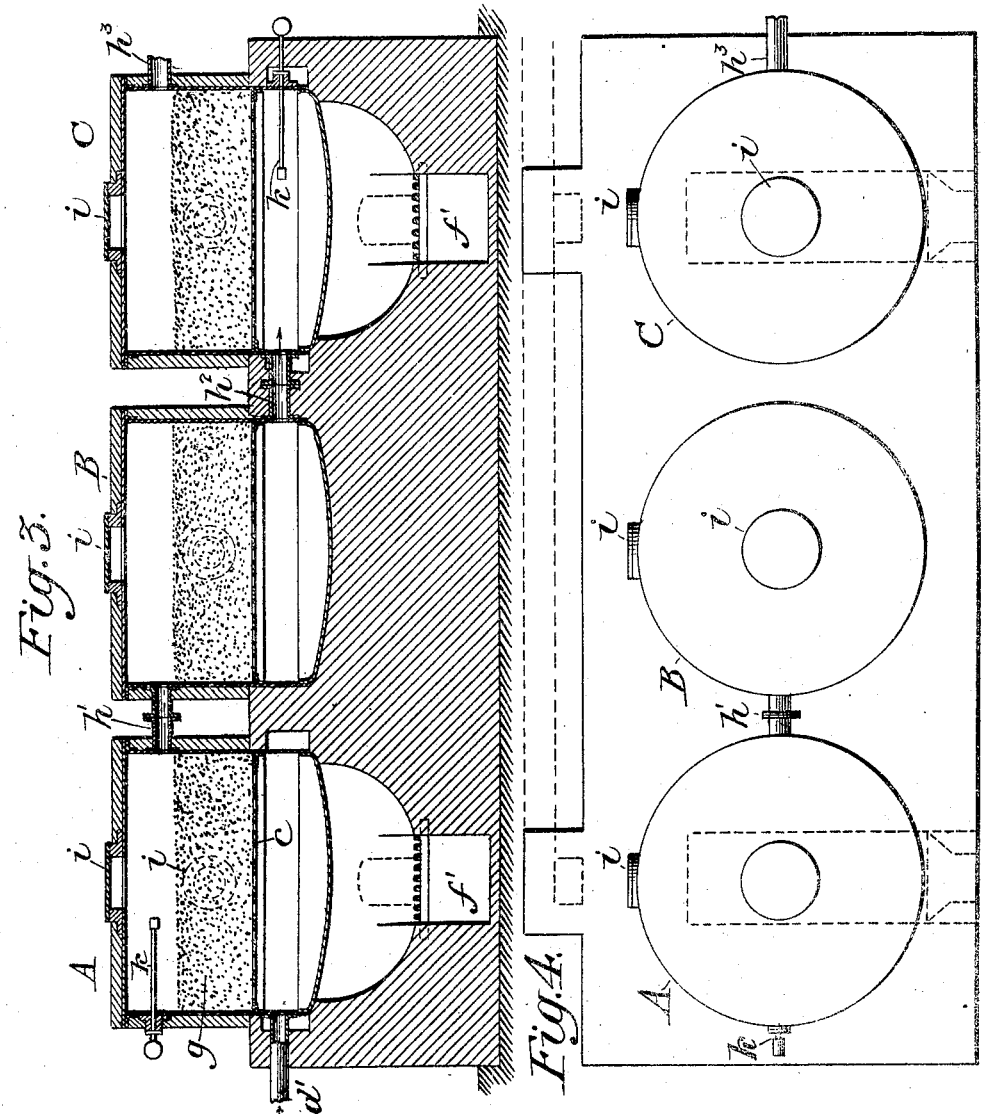
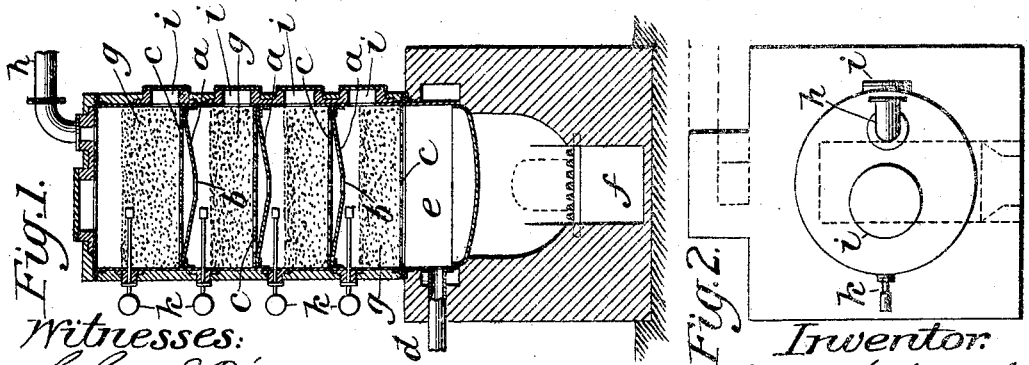

No. 793,543.

Patented June 27, 1905.

UNITED STATES PATENT OFFICE.

MAX SCHROEDER, OF DÜSSELDORF, GERMANY, ASSIGNOR TO THE NEW JERSEY ZINC COMPANY, A CORPORATION OF NEW JERSEY.

CATALYTIC APPARATUS FOR MAKING SULFURIC ANHYDRID.

SPECIFICATION forming part of Letters Patent No. 793,543, dated June 27, 1905.

Application filed August 11, 1900. Serial No. 26,644.

*To all whom it may concern:*

Be it known that I, MAX SCHROEDER, a German subject, residing at Düsseldorf, Rhineland, Germany, have invented certain new and useful Improvements in Apparatus for Making Sulfuric Acid by Catalysis; and I do hereby declare the following to be a full, clear, and exact description of the invention, such as will enable others skilled in the art to which it appertains to make and use the same.

My invention relates to certain new and useful improvements in the manufacture of sulfuric anhydrid ($SO_3$) by the so-called "contact" process, wherein the gases from roasting-furnaces or the like and which contain varying quantities of sulfurous anhydrid ($SO_2$) and oxygen are caused to pass through apparatus containing a contact mass whose catalytic action causes a union of the sulfurous anhydrid and oxygen and the consequent production of the sulfuric anhydrid, which latter is recovered by absorption, as is well understood in the art.

The union of the sulfurous anhydrid and oxygen under the influence of the contact mass is dependent upon the temperature prevailing in the apparatus. The reaction, for instance, will not take place at all if the temperature is too low, and, on the other hand, is seriously interfered with by the existence of too high a temperature in the apparatus. Where the gases are sufficiently rich in $SO_2$, the heat of reaction is an important factor in maintaining the necessary temperature within the apparatus as against losses by radiation; but where the gases are relatively poor in $SO_2$ it is especially desirable to either preheat them to a degree sufficient to compensate for the losses due to radiation or to heat the apparatus externally, so as to maintain the requisite conditions. For heating the apparatus externally it has been customary to inclose the contact material within tubes or retorts and to heat the walls thereof by products of combustion from a heating-furnace, and in certain apparatus devised by me I have employed the waste heat of the sulfuric anhydrid produced for preheating the roasting-furnace gases before the entry of the latter into the tubes or retorts containing the contact material. Where externally-heated contact tubes or retorts are employed, they must be made of relatively small dimensions, because of the speed with which the gases traverse the retorts and the consequent difficulty of transmitting to them by conduction the temperature of the external heating-gases. In order to obtain a large output, therefore, the number of contact tubes or retorts must be correspondingly increased; but in any event there is no difficulty in obtaining with the use of externally-heated contact tubes or retorts an output representing anywhere from ninety-six to ninety-eight per cent. of the sulfurous anhydrid present in the roasting-furnace gases. On the other hand, despite precautions taken for insulating the receptacle containing the contact material, it is found that apparatus of the simple form suggested by Lunge in the German edition of his *Manual of Soda Industry*, 2d edition, Vol. 1, page 790, fails to convert more than from eighty-five to ninety per cent. of the sulfurous anhydrid present into sulfuric anhydrid. Apparatus of the Lunge type comprises a system of preheating-tubes which deliver the roasting-gases into a single receptacle containing the contact mass and which is provided with a jacket of insulating material for protecting it against radiation. In such apparatus, despite the insulating-covering, that portion of the gases which in passing through the receptacle travels along in contact with the walls thereof becomes cooled to a temperature lower than that necessary for the chemical reaction, whereas that portion of the gases which passes through the center of the apparatus, where the drop in temperature is considerably slower, is obliged to travel an excessive distance not absolutely necessary for accomplishing the reaction before it drops to a temperature lower than that necessary for the chemical reaction.

The characteristic feature of my present improvement consists in avoiding the difficulties due to heat radiation in apparatus of the type referred to by a construction wherein the gases which pass in contact with the walls of the apparatus and the gases which pass through the central portion of the contact mass are mixed at least once, and preferably several times, on their passage therethrough. By this expedient the excessively-cooled gases which pass in contact with the walls of the apparatus are from time to time intimately intermingled with the hotter gases traversing the interior of the mass, so that an average temperature is established for the mixture. Because of the relatively smaller volume of the excessively-cooled gases, this average temperature is still sufficient to maintain the most favorable conditions for the catalytic action of the contact mass upon the entire volume of $SO_2$ present.

In the accompanying drawings I have illustrated two forms or modifications of apparatus embodying my invention.

Figure 1 represents in vertical section one of said forms or modifications. Fig. 2 represents a top plan view thereof. Fig. 3 represents in vertical section another form or modification of said apparatus. Fig. 4 represents a top plan view thereof.

Referring to the drawings, and particularly to Figs. 1 and 2 thereof, it will be noted that the receptacle containing the contact material $g$ is divided into several compartments by diaphragms or partitions $a$ of the general configuration of the inverted frustum of a cone having one or more openings $b$, through which openings the gases are compelled to pass in order to finally reach the exit-pipe $h$. By this arrangement those gases which have traveled along the walls of the receptacle are compelled to mix thoroughly with that portion of the gases which rises through the center of the mass, and consequently the gases from each lower compartment enter the compartment next above at a uniform temperature. Above each of the partitions $a$ is located a grate or screen $c$, through whose perforations the gases enter freely the contact mass supported under the screens. The screens $c$ and the partitions $a$ are made up of sections, so as to be readily insertible and removable through the man-holes $i$. The temperature prevailing in the various compartments may be observed by means of the pyrometers $k$. The gases containing $SO_2$, after being preheated in a preheater of suitable form enter the apparatus in a steady current through the inlet-pipe $d$, attached to the lower part $e$ of the receptacle. If preheated insufficiently, a fire may be started and maintained upon the grate $f$ for bringing them up to the desired temperature before they enter the contact mass $g$. The sulfuric anhydrid produced leaves the receptacle by way of the pipe $h$ and is led to the absorbing apparatus. It is evident that the apparatus instead of being upright may be arranged in a horizontal or inclined position without altering the described principle of operation. In such event the external heating-furnace, if employed at all, must be appropriately changed to best accommodate the altered position of the receptacle.

If with the construction described the gases entering the receptacle at an initial temperature of from 260° to 280° centigrade contain, say, six per cent., by volume, of $SO_2$, the temperature in the lower part of the apparatus will rise to from, say, 500° to 520° centigrade by reason of the increment of heat due to the chemical reaction. The constant loss of heat due to radiation gradually lowers the temperature in the upper parts of the apparatus; but by carefully insulating the receptacle the gases may be readily kept at such a temperature as to issue through the exit-pipe $h$ at from 350° to 400° centigrade, a temperature sufficient to almost completely convert $SO_2$ into $SO_3$. It is therefore usually unnecessary to preheat the gases to a temperature higher than from 260° to 280° centigrade before entering the receptacle containing the contact material. In fact, if the gases referred to (containing six per cent., by volume, of $SO_2$) were preheated to, say, 400° centigrade the additional heat caused by the chemical reaction in the lower part of the apparatus might increase the temperature to 600° centigrade or more, and although at this high temperature $SO_2$ combines with oxygen to form $SO_3$ it is not advisable to operate at so high a temperature for the reason, as hereinbefore stated, that an excessive temperature retards the reaction.

It must be remembered that as compared with the slow reaction of the gases in lead chambers the reaction in catalytic processes is very rapid. Consequently the gases pass through the contact apparatus at such a high speed that they have no opportunity to mix by diffusion, but advance in practically a straight line in the direction of current-flow. By employing the partitions $a$ the gases are compelled from time to time to find their way through comparatively narrow openings, and in so doing they are thoroughly mixed, even in contact-receptacles of very large diameters.

Where very large quantities of gas are to be dealt with, the loss of heat by radiation is relatively of less importance, and in such instance I may employ to advantage a simpler construction than the one illustrated in Figs. 1 and 2. For instance, I may dispense with the interior partitions $a$ of Fig. 1 and subdivide the receptacle containing the contact mass into several units, which may be arranged in line with each other or which may be disposed in a circular series. Thus in Figs. 3 and 4 the receptacle for the contact mass consists of a series of units A B C, as shown, each provided with hand-hole openings $i$ and with screens $c$ for supporting the contact mass $g$, and said vessels are connected by short pipes $h'$ $h^2$ of relatively small diameter. Consequently the gases to be treated entering the inlet-pipe $d'$ pass through the contact mass in the vessel A, and before issuing from the exit-pipe $h^3$ are compelled to pass through comparatively narrow pipes $h'$ $h^2$ on their progress through the apparatus. In passing through these narrow pipes the same result is obtained as is brought about by the passage of the gases through the small openings $b$ of the diaphragms shown is Fig. 1—i. e., the gases which pass through the center of the contact mass are mixed with the gases which pass upward in contact with the walls of the contact vessels and enter the next succeeding vessel of the series at the desired uniform temperature. It is of course evident that the greater the number of vessels employed the more frequent will be this alternating admixture of the gases. It is immaterial for the purposes of this invention whether the gases pass through the contact mass from below upwardly, as in the vessel A, or from above downwardly, as in the vessel B. Should the gases admitted at $d'$ be preheated insufficiently, their temperature may be raised by providing the first vessel A with a heating-furnace $f'$, as shown, for externally heating the bottom of said vessel. This will be of particular importance if the gases treated contain but a small percentage of $SO_2$. In fact, other vessels of the series may be provided with like heating means—as, for instance, the vessel C. Moreover, as indicated, each vessel is provided with a non-conducting jacket to prevent as far as possible loss of heat by radiation. It will further be understood that before their admission into the inlet-pipe $d'$ the gases are first preheated in any suitable way—as, for instance, by a system of pipes or the like heated by special firing or by waste product of combustion.

The contact material employed in either form of apparatus may be of any suitable kind—as, for instance, platinized asbestos, platinized pumice-stone, or platinized pieces of clay—or (especially for large vessels) the filling of contact material may be of the kind set forth in Letters Patent of the United States, granted to me November 14, 1899, Nos. 636,924 and 636,925, consisting of a mixture containing small quantities of platinum associated with a soluble salt—as, for instance, magnesium sulfate or bodies coated with said patented material.

Having thus described my invention, what I claim is—

1. Apparatus for the practice of the catalytic or contact process, comprising a plurality of compartments or inclosures each containing a body of "contact" material adjacent bodies of said material being separated by free mixing-spaces, in combination with passage-ways of relatively restricted area between said bodies, whereby the contact gases in passing from one body of contact material to another are intimately admixed and brought to a practically-uniform average temperature in said free mixing-spaces and by traversing the said restricted passage-ways; substantially as described.

2. Apparatus for the practice of the catalytic or contact process, comprising a plurality of compartments or inclosures, each containing a body of "contact" material and a grate upon which said contact material is supported, adjacent bodies of said material being separated by free mixing-spaces, in combination with passage-ways of relatively restricted area between said bodies; substantially as and for the purposes described.

3. Apparatus for the practice of the catalytic or contact process, comprising a series of adjoining compartments or inclosures each containing a body of contact material and separated by intervening mixing-diaphragms having centrally - disposed restricted apertures, whereby the gases passing along the walls of one compartment as well as the remaining gases are compelled to pass through the corresponding aperture before gaining admission to the adjoining compartment and consequently are intimately admixed and brought to a practically uniform average temperature; substantially as described.

4. Apparatus for the practice of the catalytic or contact process, comprising a receptacle containing a series of screens each supporting a body of contact material, and a corresponding series of diaphragms having centrally-disposed openings; substantially as described.

5. Apparatus for the practice of the catalytic or contact process, comprising a receptacle containing a series of screens each supporting a body of contact material, and a corresponding alternate series of diaphragms having centrally - disposed openings, and of the general configuration of the inverted frustum of a cone; substantially as described.

In testimony whereof I affix my signature in presence of two witnesses.

MAX SCHROEDER.

Witnesses:
WILLIAM ESSENWEIN,
P. LIEBER.